(12) United States Patent
Toper et al.

(10) Patent No.: US 10,466,988 B2
(45) Date of Patent: Nov. 5, 2019

(54) SYSTEMS AND METHODS FOR AUTOMATIC COMPUTER CODE PARALLELIZATION

(71) Applicant: ManyCore Corporation, Chicago, IL (US)

(72) Inventors: Nicolas Toper, Paris (FR); Marcus Engene, Chicago, IL (US)

(73) Assignee: ManyCore Corporation, Walnut, CA (US)

( * ) Notice: Subject to any disclaimer, the term of this patent is extended or adjusted under 35 U.S.C. 154(b) by 18 days.

(21) Appl. No.: 16/005,894

(22) Filed: Jun. 12, 2018

(65) Prior Publication Data

US 2018/0364994 A1    Dec. 20, 2018

Related U.S. Application Data

(60) Provisional application No. 62/519,324, filed on Jun. 14, 2017.

(51) Int. Cl.
*G06F 8/41* (2018.01)
*G06F 9/38* (2018.01)
(Continued)

(52) U.S. Cl.
CPC .............. *G06F 8/445* (2013.01); *G06F 8/433* (2013.01); *G06F 8/451* (2013.01); *G06F 8/456* (2013.01); *G06F 9/3017* (2013.01); *G06F 9/3836* (2013.01); *G06F 9/45516* (2013.01); *G06F 9/50* (2013.01); *G06F 11/3612* (2013.01); *G06F 11/3616* (2013.01); *G06F 11/3636* (2013.01)

(58) Field of Classification Search
CPC ...... G06F 8/445; G06F 9/3836; G06F 9/3017; G06F 11/3636
USPC ........................................................ 717/149
See application file for complete search history.

(56) References Cited

U.S. PATENT DOCUMENTS 5,151,991 A    9/1992  Iwasawa et al.
6,708,331 B1   3/2004  Schwartz
(Continued)

OTHER PUBLICATIONS

Caleb Fenton's Blog—Break Stuff to Make It Better https://calebfenton.github.io/2016/04/30/dalvik-virtual-execution-with-smalivm/, downloaded from the internet on Aug. 31, 2018.
(Continued)

*Primary Examiner* — John Q Chavis
(74) *Attorney, Agent, or Firm* — Jeffrey Schox; Padowithz Alce

(57) ABSTRACT

A system and method for automatic parallelization of computer code includes: measuring a performance of a computer program; identifying slow code of the computer program; implementing a computer code analysis of the computer program including: implementing a dependence analysis; implementing a side effect analysis of the computer program; constructing a dependency analysis basic block (DABB) graph for blocks of the code: a graphical representation of one or more possible paths through a respective disparate block of code; constructing a versioned dependency graph that optimizes a performance of the computer program; generating a metaprogram based on the versioned dependency graph; and automatically executing parallelization of the computer program at runtime based on the metaprogram.

20 Claims, 3 Drawing Sheets

(51) Int. Cl.
*G06F 9/30* (2018.01)
*G06F 11/36* (2006.01)
*G06F 9/455* (2018.01)
*G06F 9/50* (2006.01)

(56) References Cited

U.S. PATENT DOCUMENTS

| | | |
|---|---|---|
| 8,239,843 B2 | 8/2012 | Song et al. |
| 8,959,496 B2 | 2/2015 | Schulte et al. |
| 2009/0276766 A1 | 11/2009 | Song et al. |
| 2013/0145347 A1* | 6/2013 | Karr ................... G06F 8/75 717/113 |
| 2015/0317140 A1* | 11/2015 | Vaidya ............... G06F 8/314 717/119 |
| 2016/0291950 A1* | 10/2016 | Yatou .................. G06F 8/458 |
| 2017/0017476 A1* | 1/2017 | Ebcioglu ........... G06F 17/5045 |
| 2017/0249235 A1* | 8/2017 | Staples ............ G06F 11/3688 |

OTHER PUBLICATIONS

Chicken, James, Hydra—Automatic Parallelism Using LLVM, Computer Science Tripos, Part 11, Homerton College, Jun. 8, 2014, pp. 1-91.

Fonseca, Alcides et al., "Automatic Parallelization: Executing Sequential Programs on a Task-Based Parallel Runtime", International Journal of Parallel Programming, arXiv:1604.03211v1 [cs.PL], Apr. 11, 2016, 23 pages.

Gray, Jan, et al., "Towards an Area-Efficient Implementation of a High ILP Edge Soft Processor", Microsoft Research Technical Report; Authorized Jan. 2014; Released Mar. 2018, pp. 1-8.

* cited by examiner

SYSTEMS AND METHODS FOR AUTOMATIC COMPUTER CODE PARALLELIZATION

CROSS-REFERENCE TO RELATED APPLICATIONS

This application claims the benefit of U.S. Provisional Application No. 62/519,324, filed 14 Jun. 2017, which is incorporated in its entirety by this reference.

TECHNICAL FIELD

This invention relates generally to computer processing, parallelization by one or more computer processors, and code processing fields, and more specifically to new and useful code parallelization techniques and systems for enhancing performance of computers and software applications.

BACKGROUND

Modern software and/or computer applications have become very complex to accommodate the multifaceted needs of the users and increasingly complex computing systems that implement the applications. While the complexity of these applications provides desired functionalities and utilities, the complexity of the applications often causes an overall reduction in performance, and in particular, the speed at which the application operates on a computing device. Many of these applications are intended to run on limited or constrained computing devices (e.g., mobile devices, etc.) and thus, the requisite computational power is not always available to ensure that the application is performing optimally.

To improve computational performances and alleviate competition by application code for computing resources of various limited or constrained computing devices, parallelization techniques may be implemented to distribute workloads among the computing resources of the various computing devices. For instance, software developers may attempt parallelization by using a technique call speculative multithreading. Speculative threading is a dynamic parallelization technique that depends on out-of-order execution to achieve speedup on multiprocessor CPUs. Speculative multithreading, however, involves executing threads before it is known whether the thread will be needed at all. This process of speculative threading may, in turn, use up processing, energy, and memory resources of a computing device that may not need the speculatively executed threads. Additionally, in speculative threading, there is no guarantee that thread that are executed beforehand will, actually, provide the necessary processor speedup to alleviate the slowdown of a processor during execution of an application that is computing resources-intensive. Also, many implementations of speculative threading result in threading with multiple inaccuracies (e.g., issues with correctness of threaded code). Thus, while a speedup of code may sometimes be achieved using such method, at runtime, an application or program associated with the code may exhibit numerous execution issues, such as crashing and the like.

Automatic parallelization is another technique that may be used to improve program execution speed and computational performances. Automatic parallelization often relieves programmers from the manual parallelization process. However, automatic parallelization typically is performed only on source code and currently, do not include processes or techniques for parallelization of other code (e.g., IR/binary code, bytecode, etc.) outside of source code.

Thus, there is a need in the computing processors field to create an improved computer processing technique involving parallelization or the like. These inventions provide such improved computer processing techniques.

DESCRIPTION OF THE PREFERRED EMBODIMENTS

The following description of the preferred embodiments of the inventions are not intended to limit the invention to these preferred embodiments, but rather to enable any person skilled in the art of computer processing to make and use these inventions.

Overview

Embodiments of the present application enable a faster computer processing of software application code and various types of code without the use of source code. Specifically, many embodiments of the present application function to identify slow sections of code in a software application and remove these slow sections of code into threads to be executed in parallel with other sections of the code.

Embodiments of the present application function to perform automatic parallelization using bytecode and/or binary code, as input, rather than source code. Through novel parallelization techniques described in more detail below, embodiments of the present application can identify code segments (e.g., sequential code or non-sequential code) that provide the greatest processor speedup opportunities and that can also be moved into threads. By specifically identifying these code segments rather than merely speculating (e.g., speculation threading), the computer processing speedup that may be achieved are extremely greater than any existing computer code optimization techniques. Additionally, the techniques of the embodiments of the present application may be used to perform further parallelization of existing parallel code.

It shall be understood that while many of the embodiments of the present application are described in the context of using bytecode (e.g., compiled source code) or binary code, as input, the systems and methods of the present application also enable the use of source code as input for automatic parallelization.

1. System for Automatic Code Parallelization

Figure 1:
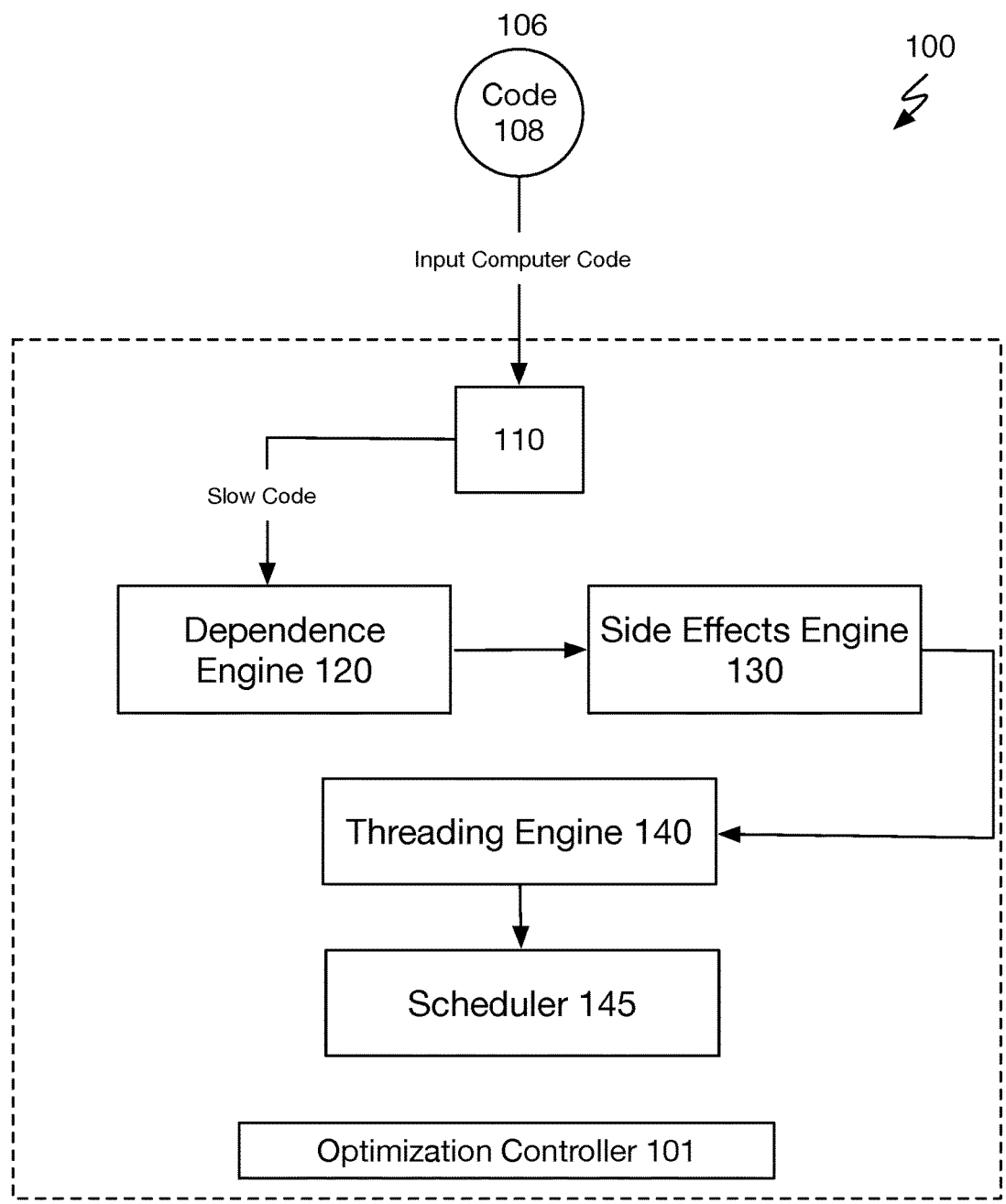
FIG. 1 illustrates a schematic of a system 100 in accordance with one or more embodiments of the present application.

As shown in FIG. 1, a system 100 includes an optimization controller 101, a code optimization detection unit 110, dependence analysis engine 120, a side effect analysis engine 130, a threading engine 140, and a thread scheduler 145. Additionally, system 100 includes a first computer processor 102, a second computer processor 104, and a storage device 106 that includes code 108. It shall be understood that while the exemplary system of the present application is described with two processes, the embodiments of the present application may function to employ a single computer processor, more than two computer processors and up to any number of computer processors.

The system 100 functions to receive code (bytecode, machine code, or code in any form or type) and automatically re-write or modify the code to speed up the computer processing of the code, during execution. Essentially, system 100 enables parallelization and accelerated processing and optimization of computer code. Specifically, system 100 may function to receive any code type, identified optimizable sections of the code, and appropriately modify the code and optimizable sections of the code in preparation for threading and subsequent execution of those threads at runtime of the entire application or program associated with the optimized code sections.

The optimizable code (e.g., slow code) detection unit (or processing circuit) 110 functions to determine one or more sections of code from a total code set of an application or the like that can be optimized in some manner. For instance, the optimizable code detection unit 110 may be able to identify code sections of an application, which perform slowly at execution relative to other sections of code in an application.

The optimizable code detection unit 110 may function to inject code performance measurement devices and other metric measure devices into code sets for measuring performances of one or more portions of a total code set or the like. The optimizable code detection unit 110 may be implemented using one or more computer processors or circuits executing a specifically designed code optimization software or the like. Additionally, one or more static analysis techniques may be implemented by the systems and methods herein, either singly or in combination with dynamic analysis techniques, for optimizing code.

The dependence analysis engine (or processing circuit) 120 functions to determine or identify any dependencies after invoking a given method. The dependence analysis engine 110 receives an application or program code set as input and functions to identify all relevant dependencies in the code set. In some embodiments, only specific optimizable code segments of an application may be used as input into the compiler for efficiency.

A side effect analysis engine 130 and the dependence analysis engine 120 together may function to perform side effects management. The side effect analysis engine 130, specifically, functions to identify side effects of operations, variables, and/or methods of a code set. For instance, side effect analysis engine 130 may be able to identify whether operations within a code set are transient or global and further, identify with particularity a type of side effect within the overarching global permanent state (e.g., permanent state read, permanent state write, etc.). The side effect analysis engine 130 may similarly be implemented using one or more computer processors or circuits executing specifically design software for detecting side effects of operations or methods of code, variables, and the like.

The threading engine 140 functions to generate a threading strategy for optimizable code sections in addition to actually threading these code sections. Thus, based on, various inputs including one or more of dependence analysis results, side effect analysis results, and the like, the threading engine 140 functions to define threading strategy (e.g., when copies of code should be passed, addition of mutexes, etc.) and threading optimizable code sections of an overall program or application.

The thread scheduler 145 functions to generate an optimal schedule for executing each of the generated threads and assignment of code and/or threads to computer resources (e.g., computer processors) for execution. For instance, scheduler 145 may function to defines events (e.g., occurrence of an external event or event related to the execution of another piece of code) that trigger an execution of a thread and/or provide start times and/or stop times for executing the thread. Implementing the scheduler 145 allows for a smooth and timely automatic parallelization of code.

Figure 1A:
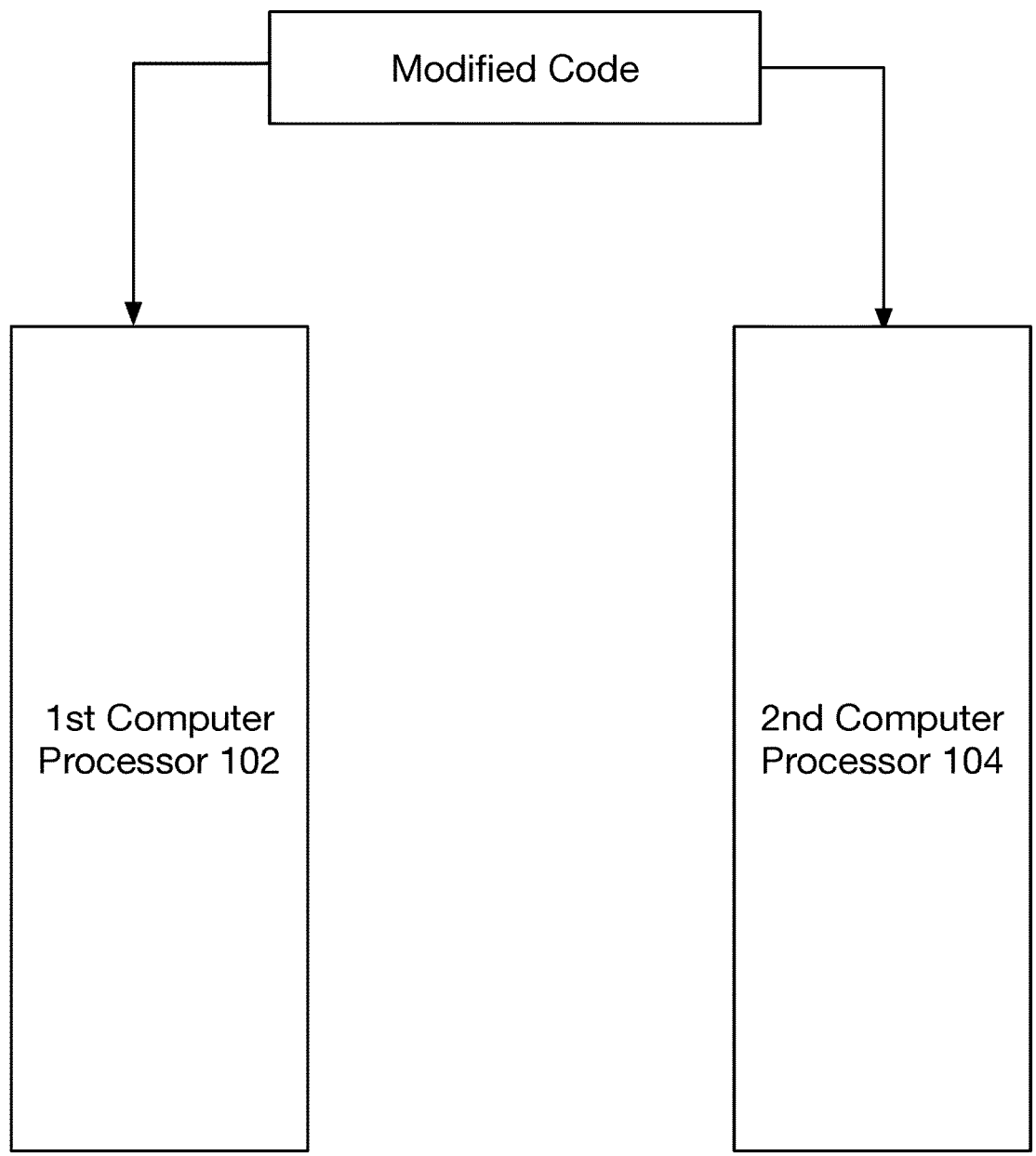
FIG. 1A illustrates a schematic portion of the system 100 in accordance with one or more embodiments of the present application.

Referring to FIG. 1A, FIG. 1A includes a computer processor 102, a computer processor 104, and modified code. The modified code preferably includes rewritten byte code (and/or machine code) 106 that includes one or more threads generated by the threading engine 140. The modified code may be stored in a non-transitory storage medium of a device implementing the modified code. Thus, the storage medium having the modified code may function as an input source for implementing parallelization between the first computer processor 102 and the second computer processor 104. As shown in FIG. 1, the primary code or main code may be transmitted to computer processor 102 for execution while, in parallel, the one or more threads of the modified code are transmitted to computer processor 104 for execution.

It shall be noted that while the modified code may be represented as a unified code body (e.g., main code and threads together), it may also be possible to store the primary or main code and the one or more threads separately in distinct storage devices or the like.

A computer processor 102 or 104, in one embodiment, is a general-purpose processor. In some embodiments, computer processor 102 or 104 is a central processing unit (CPU) for a parallelization platform, as described in system 100. In one embodiment, computer processor 102 or 104 may be a specifically designed threading is processor. In one embodiment, computer processor 102 or 104 includes a plurality of execution cores that are configured to operate independently of one another. In some embodiments, platform may include additional processors like computer processor 102 or 104. In short, computer processor 102 or 104 may represent any suitable processor. Additionally, or alternatively, the system 100 may include a plurality of or any number of processor for performing various tasks including automatic parallelization.

Second computer processor 104, in some embodiments, may be another processor that is configured to execute workloads (i.e., groups of instructions or tasks) that have been offloaded from computer processor 102 or 104. In some embodiments, processor 102 may be a special-purpose processor such as a DSP, a GPU, TPU, etc. In some embodiments, processor 104 is acceleration logic such as an ASIC, an FPGA, etc. In some embodiments, processor 104 may be a CPU (or any suitable processing circuitry). In some embodiments, processor 104 includes a plurality of multi-threaded execution cores.

Code 108, in one embodiment, may be bytecode (such as Java Virtual Machine, Android, Python, etc.), binary code (such as x86, ARM, etc.), machine code, or code 108 may be created by a compiler of a general-purpose programming language, such as BASIC, C/C++, FORTRAN, JAVA, PERL, etc. In one embodiment, code 108 is directly executable by computer processor 102 or 104. That is, code 108 may include instructions that are defined within the instruction set architecture (ISA) for computer processor 102 or 104. In another embodiment, code 108 is interpretable (e.g., by a virtual machine) to produce (or coordinate dispatch of) instructions that are executable by computer processor 102 or 104. In one embodiment, code 108 may correspond to an entire executable program. In another embodiment, code 108 may correspond to a portion of an executable program. In various embodiments, code 108 may correspond to one of a Java bytecode.

2. Method for Automatic Code Parallelization

Figure 2:
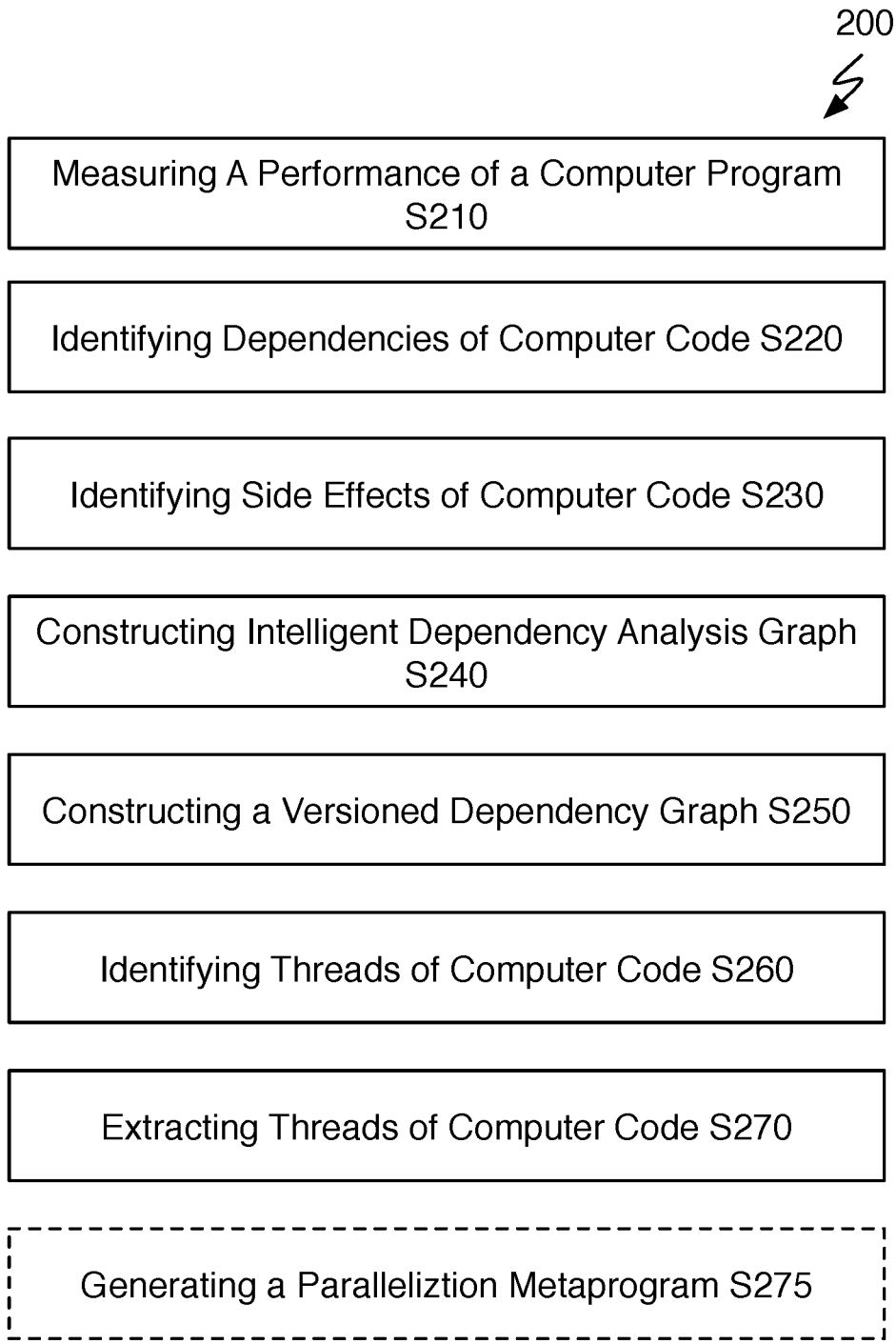
FIG. 2 illustrates a method 200 in accordance with one or more embodiments of the present application.

As shown in FIG. 2, a method 200 for automated parallelization of computer code preferably includes measuring a performance of a total code set of a program or the like and identifying one or more sections of code of the total code set that executes slowly (e.g., below a performance threshold, having sup-optimal operation or execution, etc.) S210, implementing dependence analysis of a set of code S220, identifying side effects of the analyzed data of the one or more sections of slow code S230, constructing an intelligent data structure comprising a dependency analysis basic block (DABB) of disparate basic blocks or disparate method of an application or program S240, generating or constructing a versioned dependency graph S250, identifying and/or constructing threads based on the versioned dependency graph of application or program S260, extracting threads of computer code S270, and generating and/or implementing a parallelization metaprogram S275.

The method 200 functions to preferably speed up computer processing of a software application, computer program, or the like. In a preferred embodiment, the method 200 may function to optimize parallelization and operability of an application or program using one or more of machine code, byte code, or the like and without necessarily using source code. It shall be noted, however, that source the method 200 may additionally be implemented with source code or any type of computer or machine code. The method 200 enables the automatic parallelization (e.g., task-based parallelism) of computer code (e.g., binary code, bytecode, etc.) associated with a software application or program. Once a set of computer code is identified, it may preferably be separated into palatable or workable code groups using a time barrier. A time barrier may be defined using some characteristic (e.g., preferably functional characteristic) of the code to create a subset or code grouping for analysis. For instance, a time barrier may be determined based on an initial starting point of a code section and up to a stopping or pausing event. The stopping or pausing event may cause the code to stop executing completely (e.g., based on an expiring timer) or pause until an input (e.g., a touch input to a touch screen to continue code execution) or the like is received. The defined time barriers may be utilized in the method 200 as natural lock mechanisms. Specifically, the method 200 functions to identify code sections of a primary set of code (e.g., application code or application bytecode) that executes at a slower than a performance threshold or a sub-optimal amount of time (e.g., slow code) and generate threads of these identified slow code sections. The method 200 moves or extracts these slow code sections from the primary set of code in order to execute these slow code sections separately from the primary set of code and often in parallel with the execution of other code sections in the primary set of code, when possible. Accordingly, in parallelization (e.g., parallel execution of code) of the slow code sections, the primary set of code may be executed by a main processor or the like while the slow code is executed by any available secondary processor or a secondary processing circuit of the main processor. In this way, competition for processing resources (e.g., a single processing element) of a computing device may be alleviated and code processing speedup may be achieved because the slow code is executed separately from the main code, and preferably at a same time or in advance of the main code (i.e., the unthreaded code sections) thereby allowing the main processing element to obtain speed gains similar or equal to the processing time for the slow code at the second processor.

In a variant, the method 200 is able to execute the extracted or threads of slow code at times at which the main computer processor is not in use. In such instances, the computing device may have only a single computer processor. Accordingly, the method 200 is able to identify slow code, extract the slow code, generate threads from the slow code, and execute the threads of slow code at a time at which the single processor or the like is not in use in order to alleviate a slowdown of the computer processor at a time when the processor is required to execute a primary or main set of code of an application or program. The method 200 may execute the slow code at times earlier than when the slow code is needed and sometimes between the execution of primary code section when a required or known pause (e.g., system is waiting on user input to proceed with code execution, etc.) of the primary code section is occurring. These required or known pause events or occurrences may be used as trigger points for calling for the execution of threads of slow code. For instance, threads of slow code that may typically be required after a trigger event (e.g., after user input, etc.) may be automatically be executed while a system executing the method 200 waits on an occurrence of the triggering event.

The method 200 functions to identify slow code in a variety of manners and preferably using a program analyzer that implements program analysis techniques such as static code analysis or dynamic code analysis. The program analysis techniques may implement one or more processes that automatically analyze the behavior of a computer application, application code (e.g., source code, bytecode, binary code, etc.), and the like. An aim of such application or code analysis may ultimately be for improving the application's or code's performance during execution in order to reduce computing resource and/or increase computing resource efficiencies usage (e.g., increased processor speeds, eliminate memory access conflicts, etc.) while still ensuring that the application or code performs, as intended by a developer of the code set. The method 200 may perform the application or code analysis without executing the program using, for example, static program analysis, or during runtime of the application or code using, for example, dynamic program analysis. In some embodiments, the method 200 may use a combination of both static and dynamic program analysis to identify slow code and possibly, other optimization opportunities for the application or code, including more optimal scheduling, etc.

2.1 Computing Code Analysis

S210-S230 of the method 200 generally function to perform computing/program code analysis of a computer program (computer application) or of a set of computing code. As described in more detail below, S210 may generally function to measure various performances of computing code and in a preferred embodiment, measures the performances of code and identifies sections or blocks of code that, when executed, perform relatively slowly with respect to other code sections of a program or identifies sections or blocks of code that do not satisfy one or more code performance thresholds. In a preferred embodiment, the slow code or underperforming code sections are set as the target for advanced code analysis, as described in S220 and S230.

S220, for instance, generally functions to identify the dependencies between blocks or sections of code. In a preferred embodiment, S220 may function to identify control and data dependencies which typically dictate execution-order constraints that may exist between disparate blocks of code and therefore, may be relevant inputs for identifying a threading strategy for optimizing an overall performance of a code set. S220, preferably, evaluates dependencies associated with the identified slow code sections. However, it shall be noted that S220 may function to evaluate dependencies of any suitable section of code of a code set or program.

S230, for instance, generally functions to identify side effects or hazards associated with any analyzed code section or method of a program. That is, S230 may function to identify when a section of code or block (e.g., function or expression, etc.) modifies some state (typically permanent state) outside of its scope or otherwise, has an observable interaction outside of its method. For instance, a section of code or block, when executed, may operate to modify a global variable or a static variable or the like. The existence or non-existence of side effects within a section or block of code may be used as input in identifying or generating a threading strategy for optimizing a performance and/or speed of the total program.

Referring now to S210, which includes identifying one or more sections of code of a code set that executes below a performance threshold, functions to identify sections of code in a code set that are executed at low efficiencies. That is, in some embodiments, S210 operates to determine segments of code of an application or a program that are executed by a computer processor slower or less optimally than other sections of code in the total code set or slower than a predetermined threshold (e.g., higher than a predetermined threshold of time, etc.). S210, in some embodiments, specifically identifies these less than optimally operating code sections by performing dynamic and/or static code analysis against the code set.

In a first implementation, S210 includes receiving a total code set (e.g., a complete code set for application or the like) as input for optimization and parallelization. The total code set may be provided in any code format including original source code, byte code, binary code (i.e., machine code), or the like.

Generally, dynamic code analysis is performed by executing code on a real or virtual computer processor. Accordingly, dynamic code analysis enables the use of testing data and results acquired during runtime of the code to increase the precision of the code analysis while also providing runtime protection. In embodiments of the present application, the application of dynamic code analysis may involve injecting a plurality of timers in a code set, executing the code set, and collecting traces (e.g., results of code and timers) and various performance metrics of one or more code segments of the code set. The collected traces may then be used as input to determine slow-code sections or segments of the code set and the like.

In performing dynamic code analysis on a code set, S210 may function to inject timers into sections (slices or time slices) of the code set. In particular, S210 may function to identify time slices or code time slices in the program code which represent various partial or complete functions that may be achieved by the code set. At each of these time slices, S210 may associate (or include) a timer or similar code execution tracking elements to track the performance of the code time slice. For instance, an execution time tracker may be injected or included at an identified code time slice of a code set. In such instance, at runtime, the execution of the time tracker may specifically track only the time that a computer processor requires to execute the particular code time slice. For example, the execution time tracker may determine that the computer processor requires 1671 ms to execute the code time slice that operates to display a graphical object to a display.

In particular, as a result of the injection of the timers and execution of the code set with the timers, one or more slow stacks of code should be identified based on an evaluation of the timers. Preferably, the slow stack of code is moved out into threads depending on various other factors, discussed in more detail below.

S210 may function to include any number of code execution tracking elements, such as a timer, into a code set to determine the performance of various portions of the code set. In this way, it may be determined using dynamic code analysis the sections of the code set that are slow and possibly, need to be moved into a thread for advanced or parallel execution.

Once S210 determines the performance metrics of the code sections of the code set via code execution tracking elements, the resulting performance metrics may be converted into or used as input values into a side effect analyzer or a threading engine or the like. The threading engine may be used to automatically determine a threading strategy for the code set based on the performance metrics of the code sections.

Additionally, or alternatively, S210 may implement static code analysis to detect or identify slow code sections of a code set or application. The premise of static code analysis is based on the idea that nested loops are where a majority of slow code may be found. Static analysis is generally performed without actually executing the code set of a program or application. Thus, static code analysis may also be used to discover slow code and other vulnerabilities of a code set during a development phase of the code set or even after the code has been completely written, especially those inefficiencies that relate to the execution of loops or nested loops in a program code.

The static code analysis may include a variety code analyses that may be performed individually or in combination. For instance, static code analysis may include control-flow analysis, data-flow analysis, abstract interpretation, type systems, effect systems, model checking, etc.

In a second implementation, S210 may function to identify slow code based on an analysis of a versioned dependency graph, as described below. In particular, the versioned dependency graph for a given application and/or program preferably functions to integrate lists of instructions of a control flow graph with a plurality of dependency analysis basic blocks (as described below) derived from a plurality of basic blocks of the application and/or program.

Accordingly, the versioned dependency graph outlines and/or illustrates a number of complex features of a code set of an application and/or program. Thus, in such second implementation, S210 may function to generate an estimate or prediction of compute time for each of the basic blocks of code or DABBs within a versioned dependency graph based on the features of the DABBs. For instance, for a given DABB, S210 may identify one or more features that affect compute time including, but not limited to, an amount or extent of the list of instructions included in a DABB, a number and/or type of dependencies or possible paths within the DABB, and the like. From the features identified and/or extracted from a DABB within a versioned dependency graph, S210 may function to generate estimates of compute time for each DABB or for each basic block of code of an application and/or program. For instance, features (e.g., number of dependencies, an amount of instructions, etc.) of a DABB within the versioned dependency graph that affect compute time of the DABB or basic block of code may be extracted and provided as input into a compute time estimation module. The compute time estimation module using a compute time algorithm that weighs various features of a versioned dependency graph, may function to output a prediction of compute time for the DABB.

Additionally, or alternatively, S210 may function to augment or adjust estimations of compute time for a DABB or a basic block of code based on compute time values obtained at runtime.

Thus, using a versioned dependency graph, S210 may function to identify slow code based on a prediction or estimation derived from features of a segment of code included in the versioned the dependency graph.

2.2 Computing Code Dependency Analysis

S220, which includes implementing dependence analysis of a set of code, functions to identify dependencies associated with the total code set and preferably, functions to implement dependence analysis of the slow code to determine whether the execution of one or more sections of the slow code are tied to the performance or execution of another section of code in the code set. Specifically, the dependence analysis of the segments of slow code, preferably, defined by time barriers or the like is intended to identify when some piece of data that is read, written, or updated by a method of the slow-code depends on the same piece of data that is read, written, or modified by another method. For instance, an example dependency may be a write then read (W→R) dependency in which one method or section of the method writes a piece of data and another method or another section of the same method reads the same piece of data. The opposite order of read then write (R→W) can also occur; however, this execution order relates to anti-dependence.

Dependence analysis at S220, in this regard, may produce or identify execution-order constraints between statements/instructions and specifically, between slow code sections and other sections of the code set. Accordingly, dependence analysis determines whether it is safe to reorder or parallelize slow code sections or any code statement for purposes of optimizing the code set.

Thus, S220 may be able to identify various types of dependencies that exist in the slow code including control dependencies and data dependencies. Control dependency generally involves a situation in which code executes if previous code evaluates in a way that allows its execution. For instance, a second statement may be control dependent on a first statement if and only if the second statement's execution is conditionally guarded by the first statement.

Data dependencies typically arise when two code statements access or somehow modify a same resource. Various data dependencies may exist in a code set including flow dependence, antidependence, output dependence, and input dependence. Flow dependence is normally found between two code statements if and only if a first statement modifies a resource that a second statement reads and the first statement precedes the second statement in execution. Anti-dependence typically arises between two code statement if and only if the second statement modifies a resource that the first statement reads and the first statement precedes the second statement in execution. Output dependences occurs in circumstances in which if and only if a first statement and a second statement modify the same resource and the first statement precedes the second statement in execution. Input dependence results in the situations in which if a first statement and a second statement read the same resource and the first statement precedes the second statement in execution.

Accordingly, S220 functions to identify within the slow code of a code set any dependencies that may exist within the slow code and S220 may function to modify (e.g., flagging, pointing, tagging the code, etc.) the code to identify the segments of the slow code having a dependency and a type of the dependency. For instance, a system executing S220 may identify a first segment of slow code as including an input dependency and a second segment of slow code as including an output dependency. In such instance, the system executing S220 may mark with an identifier, marker, or otherwise, the first code segment with a marking, such as <inD>, to indicate an input dependency exists and may mark with an identifier, marker, or similar, the second code segment with a marking, such as <otD>, to indicate an output dependency exists at the second code segment.

Additionally, S220 identifies the writes that are performed by the code set (including the slow code), at execution, and that will not be read or modified by a prospective slow code segment that is a candidate for threading. At a general level, the dependence analysis of the slow code sections functions to check any piece of data that is written and flag the associated method that writes the piece of data (e.g., input parameters and return values) that will stay outside of the methods of the slow code sections, which are candidates for threading. Of the identified list or pieces of data that are written, S220 functions to further check which pieces of data in that list are read by a section of or another method.

2.3 Computing Code Side Effect Analysis

S230, which identifies side effects associated with sections or blocks of code, functions to identify or detect sections or blocks of code that produce a side effect and preferably, identify or detect whether any of the execution of the slow code result in producing a side effect. Generally, a side effect (or, in some instances, permanent state) of a section or block of code may be any operation of the code that permanently alters the global state of a total code set (e.g., application, program, etc.). A side effect, however, may be any function of a section or block of code that modifies a global variable or static variable, modifies one of its arguments, raises an exception, writes data to a display or file, reads data, or calls other side-effecting functions, etc. A permanent state is a subset of side effects: network calls, IO, global variables, and the like. Thus, based on the side effect of the pieces of data written by some of the slow code sections, a threading engine may remove (or eliminate from consideration), as candidates for threading, those slow code sections having written (or modified) data with a side effect that may adversely or in other ways change a global state of the total code set.

S230, in some embodiments, may identify a permanent state of a variable or piece of data as being transient; meaning that the variables may be updated, written, and/or read and generally, passed between instances. In such case, these types of transient variables tend to remain local between methods or within different portions of a method. S230 may also identify global variables (e.g., class static fields in Java), which transcend local methods, which include variables that can be accessed from anywhere in an entire program (e.g., the total code set), including with reflection.

Therefore, S230 functions to identify the permanent state of variables within the slow code set as being transient or global and, in some instances, provide an indicator or the like within the slow code set for excluding some of or all the slow code sections that write or update global variables from a threading engine. In this way, the write/read order of the methods that write, update, and/or read these global variables may be maintained for strong consistency.

S230, therefore, functions to identify, preferably at runtime, in many slow code sets operations or variables that include side effects because the section of the slow code set may be static field in class, based on operations for file write/read, network access, inter-process communication, peripheric access (screen, keyboard, touch input, etc.), etc., native codes that can hide global variables/initializers and side effects, and the like. S230, once all methods of a code set are checked and the side effects are identified, includes generating a reference table or list of the operations having side effects.

Additionally, or alternatively, for those operations or variables having a side effect that may be permanent state read, S230 functions to specifically mark these code sections of the slow code so that the threading engine or the like may process these marked code sections, appropriately. In some embodiments, for the code sections having a permanent state read marking or indicator, a copy of these sections is provided to a thread (at execution) in order to guarantee consistency (e.g., such that these files are read before launching the thread).

With to those operations or variables having a side effect that may be permanent state write, S230 functions to generate additional coding instructions based on or using a control flow graph. The control flow graph may illustrate or demonstrate, using graph notation, all paths that might be traversed through by a code section during its execution. Thus, in such embodiments, the control flow graph may demonstrate all the possible paths that may be traversed from a marked permanent state write operation, during execution. The same algorithm use in dependence analysis may be used for generating the control flow graph.

In the varying scenarios or paths that may be traversed during execution of a permanent state write operation, S230 functions to identify which of the accesses or paths downstream from the executed permanent state write operation that can be threadified, separated, modified with a mutual exclusion (mutex), and/or the like.

In a first case, for instance, when a next access operation is soon or impending during the execution of a permanent state write operation, S230 functions to augment a primary thread with a copy of the access operation, assuming that dependency analysis allows it or otherwise, marking it as impossible if dependency analysis does not allow the augmentation. Thus, in addition to providing a copy of the permanent state write operation to a threading engine for threading, S230 functions to also add a downstream operation (e.g., the next access).

In a second case, when the next access operation downstream the permanent state write operation, during execution, is compatible (e.g., a static variable write), S230 functions to separate the two states by, for example, passing one value to thread at the threading engine.

In a third case, when the next access operation downstream the permanent state write operation, during execution, is not accessible (e.g., the access to the pstate is held behind an onClick action, some input, etc.) from the permanent state write operation being optimized, then S230 functions to add a mutex at this access operation.

2.4 Constructing Dependence Analysis Basic Block (DABB) Graphs

While the program or code analysis, as described in steps S210-S230, may be helpful for identifying dependence complexities in a code set and associated side effects of said code set, the identification of what code sections or code blocks that can be successfully moved to a thread in order to achieve meaningful optimizations of a code set for a program or application may continue to be a non-intuitive and a non-trivial technical problem. That is, results of dependence analysis and side effect analysis of a code set may provide a great amount of data for handling some optimization of the code set; however, depending on the size and/or complexity of the code set, it is often a significant time burden to traverse the resultant data in order to reconcile the methods or code blocks that may be successfully executed as a thread without adversely affecting an operation of the overall program or application.

Accordingly, S240, which includes constructing an intelligent data structure comprising a dependency analysis basic block (DABB) of disparate basic blocks or disparate methods of an application or program, functions to identify basic blocks of code within an application or a program and construct a DABB for each basic block that unambiguously identifies the methods or operations within the application or program that require and/or should be threaded. In a preferred embodiment, S240 may construct the DABB to specifically identify the list of instructions that should be moved into a thread and additionally, related lists of instructions might have to be moved together with the thread (e.g., appended to the thread).

Fittingly, S240 may construct a DABB for any suitable basic block of an application or program. Preferably, S240 constructs DABBs for each of the identified slow code sections of an application or program (as described in S210). In some embodiments, the construction of a DABB for each method or basis block of an application or program may be a sub-step of a general dependence analysis. However, the construction of a DABB or a DABB graph is preferably implemented once all or relevant dependencies and/or side effects within one or more sets of code are known or identified.

As mentioned above, in some embodiments, S240 may function to identify one or more basic blocks of code associated with slow code and function to construct one or more DABBs that identify optimization opportunities and potential strategy for the one or more basic blocks. While, in such embodiments, S240 may function to identify basic blocks of code that correspond to slow code sections in an application or a program, it shall be noted that the identified basic blocks may correspond to any suitable code section of the application or the program. A basic block generally relates to a set of code or method that may form a part of a branch of a control flow graph of an application or a program. Preferably, the basic block includes a method, function, or list of instructions that may be within or in the middle of a branch (or in between branches). That is, a basic block is typically a unit of deterministic computation (and may stop with any branch selection (e.g., at an "if" statement) or with any target of a branch selection). As an example, beginning of a basic block may be a goto target (source or initial node of a basic block). The goto instruction may have been provided by some instruction in an upstream, connected branch or another source within the code set of an application or program. An if instruction within the basic block may function to define a terminal node or ending of the basic block, as an if instruction may function to direct an execution of the application or program to a disparate branch (or disparate basis block or the like).

Accordingly, for each identified basic block, S240 may function to perform an extended dependency analysis or identify a previous dependency analysis (per S220) of the basic block and generate or construct a data structure that outlines a graphical representation of the dependencies (if any) existing within each of the identified basic blocks. Resultantly, the resulting annotated dependency graph for a given basic block may be referred to as a dependency analysis of basic block (DABB). The DABB that is constructed for a given basic block preferably functions to identify all possible paths through the basic block when provided source input or goto instruction(s) (from a source external to the basic block) and a list of registers and fields that are written by the basic block together with a list of registers and fields read and not defined in the block. For instance, each DABB has an edge source node (i.e., a beginning of the DABB) or means that is triggered when a read functions occurs. Additionally, each DABB includes an edge target (i.e., one possible terminal node of a DABB) at which point a write or an output (an if or goto instruction is executed) from the DABB is generated.

S242, may additionally, or alternatively, identify for each DABB the one or more registers (i.e., register files) from which one or more operations within a DABB reads from, when executed at runtime, and the one or more registers that the one or more operations or functions within the DABB writes to, at runtime. Specifically, for each possible path within the DABB, S240 may function to identify the registers that are read from and written to by each read and write function within a possible path in the DABB.

In a preferred embodiment, S242 may additionally function to annotate the DABB with register data. The register data may include register identification values, such as a register number or a register version number or the like of each of the identified registers that are read and each of the identified registers that are written by one or more operations or functions of a given DABB. For instance, at each read function within a DABB graph, S242 may function to annotate (or include a pointer) each read function within a DABB graph with register data that identifies the specific register file or register version number (typically these registers are not written in the basic block) that the read function reads some data or input values from. Similarly, at each write operation or function within the DABB graph, S242 may function to annotate the write function within the DABB graph with register data that identifies the specific register file(s) or register version number that the write function writes data values or some output to.

2.5 Constructing a Versioned Dependency Graph and Metagraph

The disparate DABBs that are constructed in S240 are individually helpful in providing intuitive insight for generating threading strategy for disparate methods and/or functions of an application or a program. However, apart from the often many other disparate methods and basic blocks of an application or program, the full scope of the required threading strategy for a given application or program may not be achievable.

Accordingly, S250, which includes generating or constructing a versioned dependency graph, functions to bridge a plurality of DABBs to a control flow graph of an application or program by integrating the plurality of DABBs into the control flow graph of the application or the program. Specifically, in S240 or in S250, the method 200 includes building a (versioned dependency graph) mapping between disparate code instructions (e.g., distinct functions, methods, operations, etc.) of the control flow graph of the application or program and their respective edges in the DABB graphs and vice-versa. Thus, the plurality of DABB for a plurality of basic blocks may be connected according to a target/source of each branch selector in the basic blocks. In this way, in some embodiments, S250 may function to integrate the DABB graphs into the control flow graph of the application or program according to the mapping.

Additionally, or alternatively, the constructed versioned dependency graph may be constructed and/or executed in real-time thereby enabling the versioned dependency graph to reveal in real-time threading opportunities within the code of an application and/or program. In such embodiments, the versioned dependency graph may be specifically embedded within the processing circuitry (e.g., a CPU) of a device implementing the method 200.

Additionally, or alternatively, basic blocks of an application or program are generally connected to each other through their "if" and "goto" functions. Accordingly, in one variant, S250 may function to assemble all identified basic blocks of an application or a program and connect the basic blocks according to their "if" and "goto" functions and resultantly, generate a control flow graph for the given application or program.

As mentioned above, the basic blocks of an application or program as a connected assembly (according to their if/goto nodes) of methods and/or instructions generally define a control flow graph for a given application or program. Accordingly, S250 may function to construct a versioned dependency graph by converting a control flow graph of a given application program by substituting each basic block of the control flow graph with a corresponding DABB. Specifically, S250 may function to extract the list of instructions and annotations of a DABB may insert them at the corresponding basic block (or list of instructions) within the control flow graph. Preferably, S250 functions to insert the DABB graph and associated list of instructions and annotations in the place of the corresponding basic block with the control flow graph. That is, the basic block may be deleted or removed from the control flow graph and the DABB graph inserted in the position of the deleted basic block. Additionally, or alternatively, S250 may function to augment the control flow graph with the DABB graph and associated data at the location or position of the corresponding basic block in the control flow graph.

Accordingly, the versioned dependency graph, once constructed in S250, functions to identify in the control flow graph the list of instructions that should be converted and executed as a thread (including the instructions that are required to wait for the completion of the instructions moved to a thread). Additionally, many components (or paths) of the data structure of the versioned dependency graph are preferably immutable, such that the lists of instructions and possible paths are known and/or substantially fixed; that is, the list of instructions in the versioned dependency graph may not change other than possible minor changes to identified register data (e.g., changes in register version numbers, etc.) that are read and/or written to. The immutable nature or feature of the versioned dependency graph, in such embodiments, enables a fixed computation of execution or compute time for the methods within the versioned dependency graph.

Additionally, the DABB integration enables the data structure to scale in $O(N)$ rather than $O(2^N)$. At $O(N)$, where N is the number of basic blocks, the computation of the application or program will simply grow linearly and in direct proportion to the size of the input data set rather than exponentially, as in $O(2^{2N})$. Therefore, the versioned dependency graph, when implemented, enables high compute efficiencies of the application or program when compared to the traditional solutions (e.g., path exploring) for parallelization of complex code.

2.6 Computing Threads According to a Metagraph/VDG

S260, which includes identifying and/or constructing threads based on the versioned dependency graph of application or program, includes building out one or more threads for executing one or more code sections synchronously and/or independently from other code sections of an application or program based on threading strategy derived using the versioned dependency graph.

Using a versioned dependency graph, S260 may first function to identify code instructions of the control flow graph that may be desirable for threading (i.e., have a high threading value or weight). Preferably, the selected code instructions from the control flow graph relate to or may be associated with slow code (possibly detected in S210). However, it shall be noted that the selected code instructions may be based on any suitable indication within the versioned dependency graph including pointers, weights, scoring values (e.g., thread scoring values), mutex positioning or placement within the graph, and/or the like that identifies the code instructions as a suitable candidate for threading.

Accordingly, based on the versioned dependency mapping, S260 may function to map the code instructions from the control flow graph to an edge of a corresponding DABB graph for the code instructions selected or identified within the control flow graph. Once the corresponding edge of the DABB graph is located, S260 may function to evaluate the paths and/or instructions within the DABB and convert a path of the DABB graph into a list of code instructions (using pointers and annotations within the DABB) and the register data associated with the path. In such embodiments, S260 may collect the version numbers of the registers (e.g., current registers) as input for generating the list of instructions for the path and/or function to associate the register data with the functions or operations in the list of instructions that use the one or more register files identified within the register data.

The list of instructions generated in S260 for each DABB graph may be used as input into or a control flow graph component in the versioned dependency graph. That is, when converting the control flow graph of the application or program to a versioned dependency graph, S250 may function to replace (or augment) the basic blocks of code in the control flow graph with the generated list of instructions for each DABB.

In a preferred embodiment, S260 may subsequently or contemporaneous with the processing of the DABB function to identify any direct children of the DABB as optional threads. For instance, S260 may function to check the register data of the current registers to identify whether a read register is included in the data. In a first case, if the register data does not include a read register, then S260 may function to collect the direct children of the DABB until the end of the method of the DABB. However, in the case, that a read register is detected in the register data of the DABB, S260 may function to add the "if" instruction associated with the read register into a special list of instructions and correspondingly, remove the read registers from the current registers of the DABB. Accordingly, in the case that there is a read register in the current registers of a DABB, S260 functions to identify the read register and move an associated "if" instruction to a special list for threading and additionally, update the current registers of the DABB. The special list of "if" instructions extracted from the DABB may be used as input for thread extraction. In some embodiments, when the "if" instruction is found in a branch of the portion of the control flow graph associated with the DABB, the threading engine may function to extract the "if" instruction as an optional thread.

Additionally, or alternatively, in the case that S260 identifies multiple threads or threading opportunities within the versioned dependency graph having a common time of execution for an application and/or program, S260 may function to allocate the execution of each of the multiple threads to disparate, multiple cores and further, synchronize the execution of each of the multiple threads with a mutex or other synchronization annotation. For instance, in the case that two identified threads have a same execution time, as determined using the versioned dependency graph, S260 may function to split or direct the execution of each of the two threads to different computing cores or processing circuits of a device implementing the method 200 and further, enable both threads to be executed at the same time with mutex annotation.

While it is generally described that the multiple threads having a common execution time may be spread among multiple processing cores, it shall be noted that in some embodiments that the execution responsibility of the multiple threads may be spread among sub-processing cores of a single computing core or the like to achieve the synchronization of execution required by the application and/or program.

2.7 Computing Code Reconstruction

S270, which includes extracting threads of computer code, functions to extract threads of computing code instructions based on inputs derived from the versioned dependency graph.

In a first implementation, the versioned dependency graph preferably functions to outline groups of instructions and/or lists of instructions together with an indication of whether a distinct group of instructions and/or a list of instructions are suitable for extraction as threads. The indication of whether a group or list of instructions within the versioned dependency graph may be extracted for threading may be a binary indicator or value, such as YES/NO, Thread/Not Thread, i/o, or similar annotation to the group or list of instructions.

Additionally, or alternatively, the versioned dependency graph may indicate a threadbility of a group or list of instructions by identifying a threading weight, or a threading score that may be specifically associated with (e.g., annotated) a group or list of instructions within the versioned dependency graph. The threading weight or the threading score, in some embodiments, may be generated based on one or more features or attributes of the group or list of instructions. The threading weight or the threading score preferably relate to a threadability of the method or function associated with the group or list of instructions. For instance, some positive factors or features that may positively influence the weight or score for threading a group or list of instructions may include that the list or group of instructions comprises slow code or that there are no or limited side effects when executing the list or group of instructions. Some factors or features of the group or list of instructions that may negatively impact the threading weight or threading score may include that the potential speed of the overall program if the group or list of instructions are extracted as a thread is nominal (e.g., not a good use of parallelization computing resources) or that too many or complex side effects result, when executing the code, such that threading the group or list of instructions may adversely complicate an operation of the application or program. It shall be noted any suitable feature of the list or group of instructions may be considered when determined a thread weighting or thread scoring value for the given list or group of instructions.

Accordingly, in such implementation, if the threading weight or the threading score associated with a group or list of instructions satisfies a predetermined or dynamic threading threshold, S270 may function to extract as one or more threads the group or list of instructions associated with the satisfactory threading weight or threading score.

In a second implementation, S270, may function to automatically rewrite sections of the code based on results of the dependency analysis and/or the side effect analysis of the code set, functions to generate one or more threads of the slow code sections. In such implementation, S270 may be implemented by a threading engine, such as threading engine 140. In particular, S270 may function to receive as input the sections of slow code that are eligible for threading. Additionally, or alternatively, S270 may annotate the total code set (e.g., the application or program) with threading instructions based on the dependence and side effect analysis. For instance, S270 functions to provide threading instructions to add a mutex (mutually exclusive) to the code set for each instance of a read dependency (e.g., permanent state read dependency) downstream a permanent state write operation or add a copy of an access operation, etc.

Additionally, in the case of identified side effects or possible side effects, S270 may also function to augment threads or the code set with a piece of decision code. In some embodiments, it may be difficult to anticipate (statically) an effect of threading or modifying a global variable, network access, I/O, pstate variable, etc. In such instances, S270 may function to identify these equivocal or indeterminate instances and generates a decision code that is augmented to the code set or along with a thread associated with the indeterminate circumstance. The decision code, at runtime, may decide whether or not a thread having a potential side effect should be generated and executed or pulled from memory and executed. Additionally, or alternatively, the decision code may determine whether or not additional code, such as copies of code for the primary code set should be provided with (or appended) a thread to be executed. Thus, the decision code may include multiple paths for executing or not executing a thread associated with one or more side effects.

Additionally, or alternatively, S270 may also function to schedule the execution of the threading. S270 may be implemented by a scheduler, such as thread scheduler 145. S270, using a thread scheduler, may function to lists, in terms of execution and start times, all the threads and their dependencies on each other and/or other methods or operations of the applications or program. S270 may function to generate an optimal thread execution schedule, in terms of number of processors to be used and/or the total time of execution for the code that enables a fast execution time of the application or program.

Optionally, or additionally, S275, which includes compiling threading data (e.g., list of instructions) and a thread execution schedule derived from the versioned dependency graph or the like into a parallelization metaprogram, may function to assemble the threads and their associated execution schedules (e.g., execution order, execution constraints, etc.) into a parallelization sub-program that may be injected into or integrated (augmented) with the overall application or main computer program. At runtime, the metaprogram may be executed in parallel with the main application or main computer program and may operate to automatically control and/or govern which threads of the metaprogram are executed, the time and order of execution of the threads.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method that automates computer code parallelization, the computer-implemented method comprising:
measuring a performance of a computer program includes identifying performance metrics for one or more disparate blocks of code of the computer program;
identifying a subset of the one or more disparate blocks of code that do not satisfy a performance threshold;
implementing a computer code analysis of the subset of the one or more disparate blocks of code, wherein implementing the computer code analysis includes:
implementing a dependence analysis of the subset of the one or more disparate blocks of code and collecting dependence data resulting from the dependence analysis;
implementing a side effect analysis of the subset of the one or more disparate blocks of code and collecting side effect data resulting from the side effect analysis;
constructing a dependency analysis basic block (DABB) graph for each disparate block of code of the subset of the one or more disparate blocks of code, wherein the DABB graph for each disparate block code of the subset comprises:
a graphical representation of one or more possible paths through a respective disparate block of code of the subset of the one or more disparate blocks of code, wherein the graphical representation of the one or more possible paths is generated based on a list of code instructions derived from a control flow graph of the computer program that corresponds to the respective disparate block of code of the subset;
one or more annotations indicating an ability to thread the respective disparate block of code of the subset based on the dependence data and the side effect data;
constructing a versioned dependency graph that optimizes a performance of the computer program, wherein constructing the versioned dependency graph includes:
integrating the DABB graph for each disparate block of code of the subset within the control flow graph of the computer program;

injecting a metaprogram into the computer program, wherein the metaprogram is based on the versioned dependency graph; and automatically executing parallelization of the computer program at runtime based on the metaprogram.

2. The computer-implemented method according to claim 1, wherein the metaprogram comprises:

a threading strategy derived from the versioned dependency graph that enables parallelization of the one or more disparate blocks of code as one or more threads; and an optimal execution schedule for each of the one or more threads based on the dependence data.

3. The computer-implemented method of claim 1, further comprising:

generating a mapping between disparate code instructions of the control flow graph of the computer program and corresponding edges in the DABB graph for each of the disparate blocks of code of the subset.

4. The computer-implemented method of claim 3, wherein integrating the DABB graph for each disparate block of code of the subset within the control flow graph is based on the generated mapping.

5. The computer-implemented method of claim 1, wherein integrating the DABB graph for each disparate block of code of the subset into the control flow graph includes:

inserting the DABB graph for each disparate block of code in the place of the corresponding basic block in the control flow graph.

6. The computer-implemented method of claim 1, wherein integrating the DABB graph for each disparate block of code of the subset into the control flow graph includes:

augmenting the control flow graph of the computer program with the DABB graph for each disparate block of code at a position of the corresponding basic block in the control flow graph.

7. The computer-implemented method of claim 1, further comprising:

generating a threading weight for each of the disparate blocks of code of the subset based on one or more features of the disparate blocks of code; and annotating the DABB graph corresponding to each of the disparate blocks of code of the subset with the threading weight.

8. The computer-implemented method of claim 7, further comprising:

extracting to a thread one or more of the disparate blocks of code of the subset if the threading weight associated with each of the one or more disparate blocks satisfies a threading weight threshold.

9. The computer-implemented method of claim 1, generating a threading weight for each of the disparate blocks of code of the subset based on one or more features of the disparate blocks of code; and annotating the DABB graph corresponding to each of the disparate blocks of code of the subset with the threading weight.

10. The computer-implemented method of claim 9, further comprising:

extracting to a thread one or more of the disparate blocks of code of the subset if the threading score associated with each of the one or more disparate blocks satisfies a threading score threshold.

11. The computer-implemented method according to claim 1, wherein the computer code comprises one of byte code and machine code of the computer program that is distinct from a source code of the computer program.

12. The computer-implemented method of claim 1, wherein one or more sections of the versioned dependency graph comprise immutable paths;

extracting to threads instructions associated with the immutable paths.

13. The computer-implemented method according to claim 1, wherein measuring the performance of the computer program includes injecting a plurality of traces into the computer program and collecting performance metrics of the computer program based on measurements of the plurality of traces, at runtime.

14. The computer-implemented method according to claim 3, further comprising:

identifying a path within the DABB graph for each of the disparate blocks of code of the subset;

converting the identified path within the DABB graph for each of the disparate blocks of code into a list of code instructions;

identifying register data associated with the path, wherein the register data comprises version numbers of register files that are used by one or more operations along the path; and associating the register data with the list of code instructions.

15. The computer-implemented method of claim 1, wherein integrating the DABB graph for each disparate block of code of the subset into the control flow graph includes:

inserting the list of code instructions derived from the DABB graph for each disparate block of code in the place of the corresponding basic block in the control flow graph.

16. A system that automates computer code parallelization, the system comprising:

optimizable code detection circuit that:

measures a performance of a computer program includes identifying performance metrics for one or more disparate blocks of code of the computer program;

identifies a subset of the one or more disparate blocks of code that do not satisfy a performance threshold;

dependence analysis circuit that performs a dependence analysis of the subset and collects dependence data resulting from the dependence analysis;

side effect analysis circuit that performs a side effect analysis of the subset and collects side effect data resulting from the side effect analysis;

one or more computer processing circuits that:

construct a dependency analysis basic block (DABB) graph for each disparate block of code of the subset of the one or more disparate blocks of code, wherein the DABB graph for each disparate block code of the subset comprises:

a graphical representation of one or more possible paths through a respective disparate block of code of the subset of the one or more disparate blocks of code, wherein the graphical representation of the one or more possible paths is generated based on a list of code instructions derived from a control flow graph of the computer program that corresponds to the respective disparate block of code of the subset;

one or more annotations indicating an ability to thread the respective disparate block of code of the subset based on the dependence data and the side effect data;

construct a versioned dependency graph that optimizes a performance of the computer program, wherein constructing the versioned dependency graph includes:

integrating the DABB graph for each disparate block of code of the subset within the control flow graph of the computer program;

injecting a metaprogram into the computer program, wherein the metaprogram is based on the versioned dependency graph; and automatically executes parallelization of the computer program at runtime based on the metaprogram.

17. A computer-implemented method for constructing a versioned dependency graph that enables automated computer code parallelization, the computer-implemented method comprising:

constructing a versioned dependency graph that optimizes a performance of a computer program, wherein constructing the versioned dependency graph includes:

(i) implementing a computer code analysis of one or more disparate blocks of code of the computer program, wherein implementing the computer code analysis includes:

implementing a dependence analysis of the one or more disparate blocks of code and collecting dependence data resulting from the dependence analysis;

implementing a side effect analysis of the one or more disparate blocks of code and collecting side effect data resulting from the side effect analysis;

(ii) constructing a dependency analysis basic block (DABB) graph for each of the one or more disparate blocks of code of the computer program, wherein the DABB graph for each of the one or more disparate blocks code comprise:

a graphical representation of one or more possible paths through a respective disparate block of code of the one or more disparate blocks of code, wherein the graphical representation of the one or more possible paths is generated based on a list of code instructions derived from a control flow graph of the computer program that corresponds to the respective disparate block of code;

one or more annotations indicating an ability to thread the respective disparate block of code based on the dependence data and the side effect data;

(iii) integrating the DABB graph for each of the one or more disparate blocks of code within the control flow graph of the computer program;

(iv) injecting a metaprogram into the computer program, wherein the metaprogram is based on the versioned dependency graph; and (iv) automatically executing parallelization of the computer program at runtime based on the metaprogram.

18. The computer-implemented method according to claim 17, wherein the metaprogram comprises:

a threading strategy derived from the versioned dependency graph that enables parallelization of the one or more disparate blocks of code as one or more threads; and an optimal execution schedule for each of the one or more threads based on the dependence data.

19. A computer program product comprising a non-transitory storage medium that, when executed using one or more computer processes, performs the computer-implemented method according to claim 1.

20. A computer program product comprising a non-transitory storage medium that, when executed using one or more computer processes, performs the computer-implemented method according to claim 17.

* * * * *